United States Patent
Lucas et al.

(10) Patent No.: US 9,497,549 B2
(45) Date of Patent: Nov. 15, 2016

(54) LEVERED LOUDSPEAKERS

(71) Applicant: Bose Corporation, Framingham, MA (US)

(72) Inventors: Brian M. Lucas, Marblehead, MA (US); Johan H. Isaksson, Malmo (SE); Geoffrey C. Chick, Norfolk, MA (US); Weidong Zhu, Newton, MA (US); Benjamin G. K. Peterson, West Boylston, MA (US)

(73) Assignee: Bose Corporation, Framingham, MA (US)

( * ) Notice: Subject to any disclaimer, the term of this patent is extended or adjusted under 35 U.S.C. 154(b) by 281 days.

(21) Appl. No.: 14/200,713

(22) Filed: Mar. 7, 2014

(65) Prior Publication Data

US 2015/0256936 A1    Sep. 10, 2015

(51) Int. Cl.
| | |
|---|---|
| H04R 11/02 | (2006.01) |
| H02K 7/00 | (2006.01) |
| H02K 35/02 | (2006.01) |
| H02K 21/32 | (2006.01) |
| H04R 1/02 | (2006.01) |
| H04R 7/00 | (2006.01) |

(52) U.S. Cl.
CPC ............. *H04R 11/02* (2013.01); *H02K 7/003* (2013.01); *H02K 21/32* (2013.01); *H02K 35/02* (2013.01); *H04R 1/02* (2013.01); *H04R 7/00* (2013.01)

(58) Field of Classification Search
CPC ...... H04R 11/02; H02K 21/32; H02K 7/003; H02K 35/02
USPC ....... 381/161, 162, 395, 417, 418, 421, 422, 381/431
See application file for complete search history.

(56) References Cited

U.S. PATENT DOCUMENTS

| | | | | |
|---|---|---|---|---|
| 1,718,357 | A | * | 6/1929 | Hutchison ............. H04R 11/00 381/162 |
| 1,756,201 | A | * | 4/1930 | Kiernan .................. H04R 7/12 381/162 |
| 1,823,512 | A | | 9/1931 | Ringel |
| 1,973,277 | A | | 9/1934 | Barfield |
| 2,035,104 | A | | 3/1936 | Thomas |

(Continued)

FOREIGN PATENT DOCUMENTS

| | | |
|---|---|---|
| CN | 203015064 U | 6/2013 |
| CN | 203193871 U | 9/2013 |

(Continued)

OTHER PUBLICATIONS

International Search Report and Written Opinion dated Jun. 2, 2015 for International application No. PCT/US2015/018279.

(Continued)

*Primary Examiner* — Jesse Elbin (57) ABSTRACT

A loudspeaker includes an acoustic diaphragm, a lever, and an oscillatory force source for driving the lever in oscillatory, rotary motion about a pivot axis. The loudspeaker also includes a connector that couples the lever to the acoustic diaphragm. The connector includes a first rotary joint that defines a first rotary axis that is fixedly attached to the acoustic diaphragm, a second rotary joint that defines a second rotary axis that is fixedly attached to the lever, and a linkage coupling the first and second rotary joints. The connector allows for rotational and translational movement of the lever and the diaphragm relative to each other.

20 Claims, 8 Drawing Sheets

(56) References Cited

U.S. PATENT DOCUMENTS

| | | |
|---|---|---|
| 2,078,469 A | 4/1937 | Thomas |
| 2,245,511 A | 6/1941 | Turnbull |
| 3,777,078 A | 12/1973 | Boutros-Attia et al. |
| 3,836,733 A | 9/1974 | Cragg |
| 3,937,904 A | 2/1976 | Parker |
| 4,626,717 A | 12/1986 | Hensing et al. |
| 5,216,723 A | 6/1993 | Froeschle et al. |
| 5,802,189 A | 9/1998 | Blodget |
| 6,405,599 B1 | 6/2002 | Patt |
| 6,415,037 B1 | 7/2002 | Wang |
| 7,247,957 B2 | 7/2007 | Dadd |
| 8,139,813 B2 | 3/2012 | Kobayashi et al. |
| 9,258,648 B2 | 2/2016 | Lucas et al. |
| 2008/0247595 A1 | 10/2008 | Henry |
| 2011/0243365 A1 | 10/2011 | Carlmark et al. |
| 2011/0243366 A1 | 10/2011 | Carlmark et al. |
| 2012/0106772 A1 | 5/2012 | Horigome et al. |
| 2012/0248899 A1 | 10/2012 | Oommen et al. |
| 2014/0064539 A1 | 3/2014 | Link et al. |
| 2014/0270328 A1 | 9/2014 | Lucas et al. |
| 2014/0334662 A1 | 11/2014 | Lin |
| 2015/0256046 A1 | 9/2015 | Lucas et al. |
| 2015/0256911 A1 | 9/2015 | Lucas et al. |
| 2015/0256936 A1 | 9/2015 | Lucas et al. |

FOREIGN PATENT DOCUMENTS

| | | |
|---|---|---|
| GB | 212648 A | 3/1924 |
| GB | 1124830 A | 8/1968 |
| JP | S6212300 | 1/1987 |
| JP | 2009225091 A | 10/2009 |

OTHER PUBLICATIONS

International Search Report and Written Opinion dated May 26, 2015 for International application No. PCT/US2015/018699.
International Search Report and Written Opinion dated May 20, 2015 for International application No. PCT/US2015/018702.
International Search Report and Written Opinion dated May 29, 2015 for International application No. PCT/US2015/018714.
http://bushingsinc.com/index.php/bushings-inc-products-lines/rubber-flex-bushings; retrieved 2007.
International Search Report and Written Opinion dated Aug. 4, 2014 for International application No. PCT/US2014/021559.
International Search Report and Written Opinion dated Aug. 4, 2014 for International application No. PCT/US2014/021592.

\* cited by examiner

LEVERED LOUDSPEAKERS

BACKGROUND

This disclosure relates to levered loudspeakers.

It is generally desirable for diaphragms of electroacoustic transducers to move pistonically. When a diaphragm is driven by a lever, the arcuate motion of the end of the lever coupled to the diaphragm must be coupled to the diaphragm in a way that allows pistonic motion to be obtained.

SUMMARY

In one aspect, a loudspeaker includes an acoustic diaphragm, a lever, and an oscillatory force source for driving the lever in oscillatory, rotary motion about a pivot axis. The loudspeaker also includes a connector that couples the lever to the acoustic diaphragm. The connector includes a first rotary joint that defines a first rotary axis that is fixedly attached to the acoustic diaphragm, a second rotary joint that defines a second rotary axis that is fixedly attached to the lever, and a linkage coupling the first and second rotary joints. The connector allows for rotational and translational movement of the lever and the diaphragm relative to each other.

Implementations may include one of the following features, or any combination thereof.

In some implementations, the first and second rotary axes are arranged parallel with each other and parallel with the pivot axis.

In certain implementations, the linkage includes a pair of links which couple the first and second rotary joints. The pair of links includes a first link that couples a first end portion of the first rotary joint to a first end portion of the second rotary joint, and a second link that couples a second end portion of the first rotary joint with a second end portion of the second rotary joint.

In some cases, the connector is in the form of a unitary clip.

In certain cases, the first and second rotary joints are formed integrally with the linkage.

In some examples, the connector is a stamped, unitary part.

In certain examples, the connector is formed of spring steel.

In some implementations, the first rotary joint includes a torsion bar which twists about the first rotary axis as rotary motion of the lever drives the acoustic diaphragm in a pistonic motion.

In certain implementations, the second rotary joint includes a torsion bar which twists about the second rotary axis as rotary motion of the lever drives the acoustic diaphragm in a pistonic motion.

In some cases, the first rotary joint includes a first torsion bar which twists about the first rotary axis as rotary motion of the lever drives the acoustic diaphragm in a pistonic motion, and the second rotary joint includes a second torsion bar which twists about the second rotary axis as rotary motion of the lever drives the acoustic diaphragm in a pistonic motion, and the second torsion bar is configured to twist more than the first torsion bar as rotary motion of the lever drives the acoustic diaphragm in a pistonic motion.

In certain cases, the second torsion bar is longer and thinner, in direction perpendicular to a motion axis of the acoustic diaphragm, than the first torsion bar.

In some examples, the first rotary joint includes a tab including a mounting hole for receiving a fastener for securing a central portion of the first rotary joint to the acoustic diaphragm.

In certain examples, the second rotary joint includes a tab including a mounting hole for receiving a fastener for securing a central portion of the second rotary joint to the lever.

In some implementations, the connector is formed integrally with the lever.

In certain implementations, the connector is formed integrally with the diaphragm.

In some cases, at least part of the lever is formed around the connector in an insert molding process.

In certain cases, at least part of the diaphragm is formed around the connector in an insert molding process.

In another aspect, a loudspeaker includes an acoustic diaphragm, a lever, and an oscillatory force source for driving the lever in oscillatory, rotary motion about a pivot axis. The loudspeaker also includes a connector for coupling the lever to the acoustic diaphragm. The connector includes a first torsion bar configured to twist about a first rotary axis. A central portion of the first torsion bar is secured to the lever such that the first rotary axis does not move relative to the lever. The connector allows for rotational and translational movement of the lever and the diaphragm relative to each other.

Implementations may include one of the above and/or below features, or any combination thereof.

In some implementations, distal end portions of the first torsion bar are fixedly secured to the acoustic diaphragm.

In certain implementations, the distal end portions of the first torsion bar twist about the first rotary axis, thereby allowing the lever to rotate and translate laterally relative to the diaphragm, as the acoustic diaphragm is driven in pistonic motion via rotational movement of the lever.

In some cases, the connector also includes a second torsion bar that is configured to twist about a second rotary axis, and a linkage that couples the first and second torsion bars. A central portion of the second torsion bar is fixedly secured to the acoustic diaphragm. The linkage is configured to rotate about the first and second rotary axes, without bending, as the acoustic diaphragm is driven in pistonic motion via rotational movement of the lever.

DETAILED DESCRIPTION

Figure 1A:
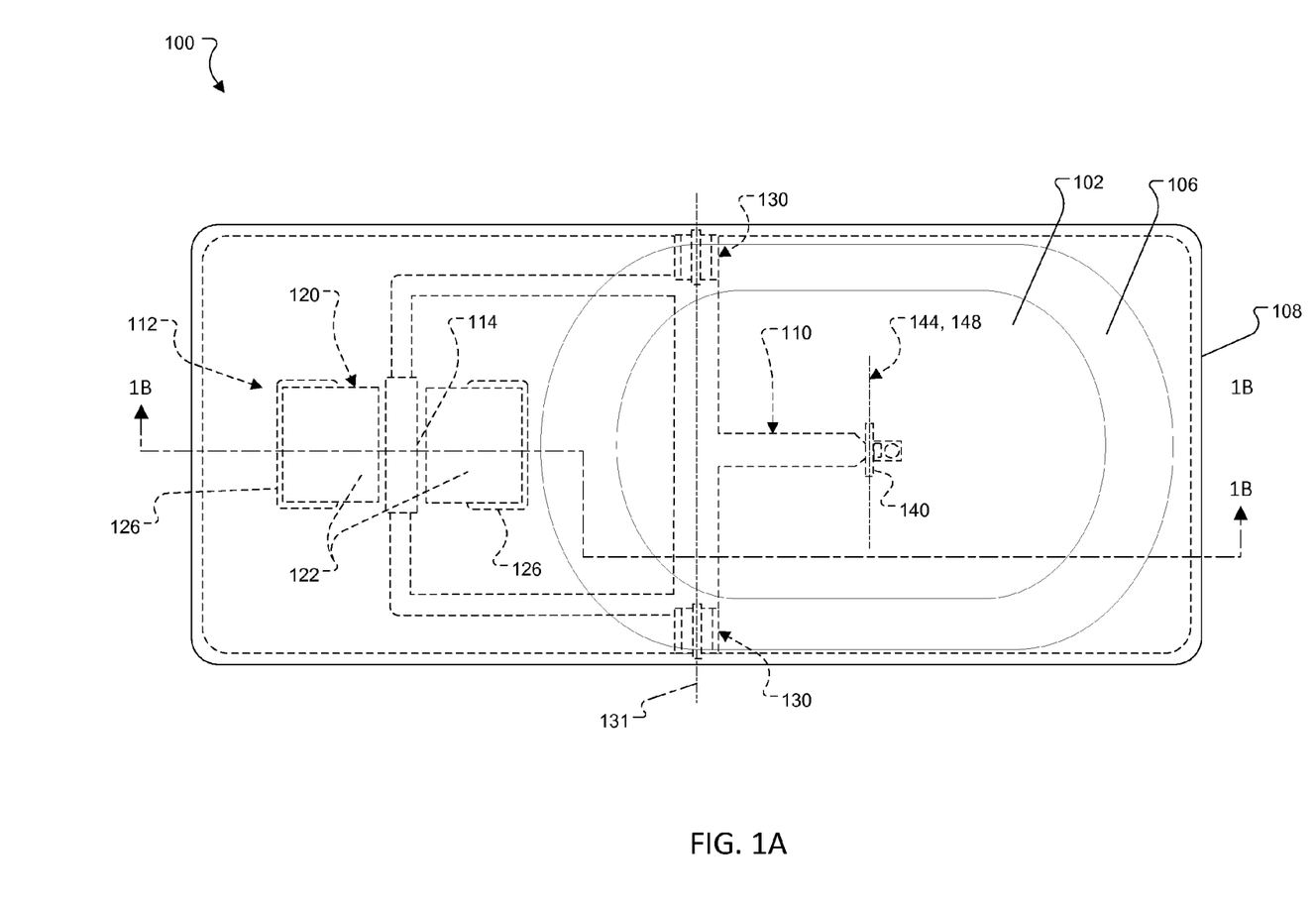
FIG. 1A is a top plan view of a loudspeaker that employs a lever which drives an acoustic diaphragm.
Figure 1B:
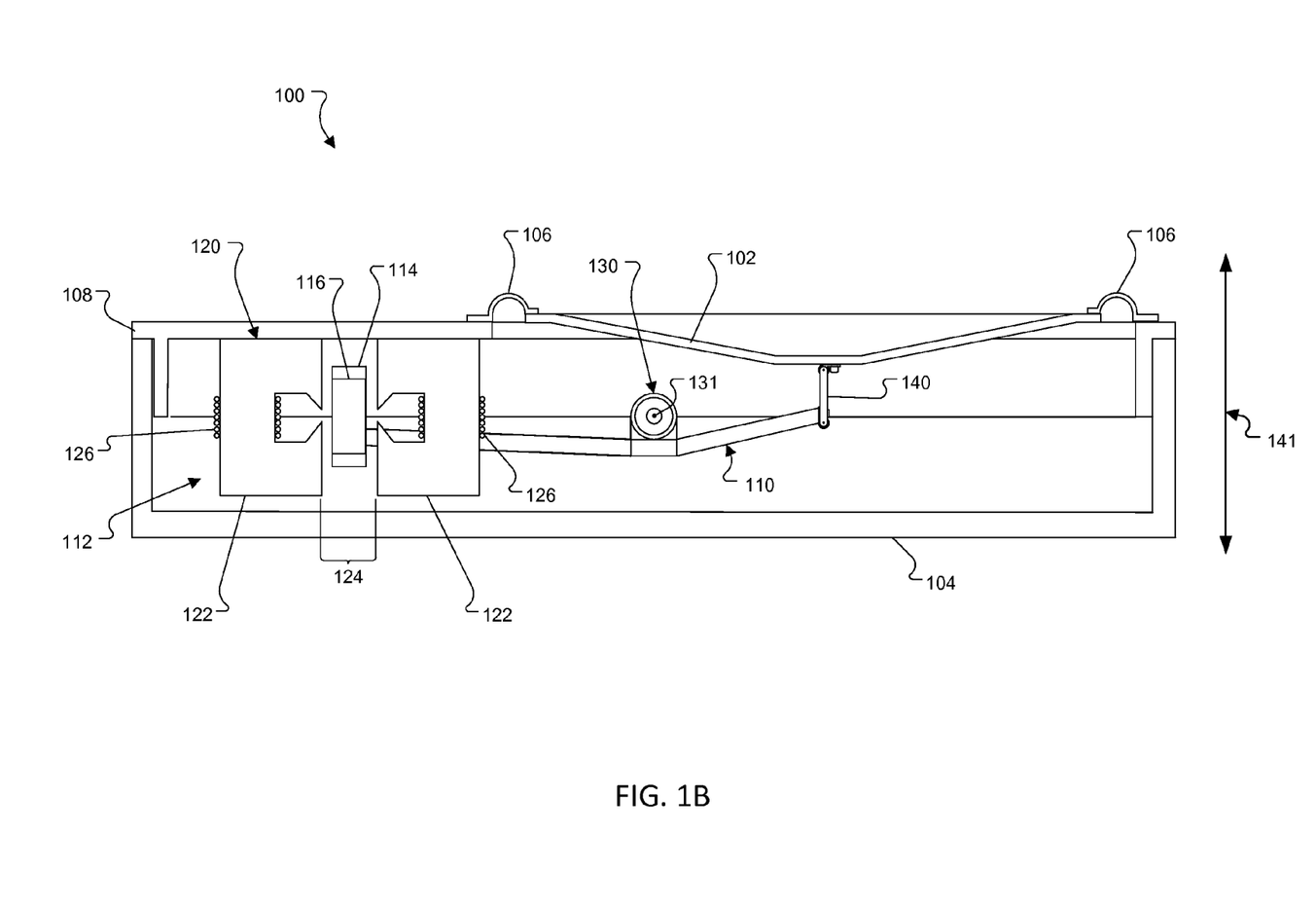
FIG. 1B is a cross-sectional side view of the loudspeaker of FIG. 1A, taken along line 1B-1B.

Referring to FIGS. 1A and 1B, a loudspeaker 100 includes an acoustic diaphragm 102 (e.g., a cone type speaker diaphragm, also known simply as a "cone") that is mounted to an enclosure 104, which may be metal, plastic, or other suitable material, by a surround 106. For example, in some instances the surround 106 is mounted to a frame 108 and the frame 108 is connected to the enclosure 104. The loudspeaker 100 includes a lever 110 that is mechanically connected at one point along the lever 110 to the acoustic diaphragm 102 and at another point along the lever 110 to an oscillatory force source 112.

In the illustrated example, the oscillatory force source 112 includes a substantially planar armature 114 that is attached to the lever 110. The armature 114 includes one or more permanent magnets 116 (one shown). The armature 114 and the lever 110 may be part of one unitary structure. The oscillatory force source 112 also includes a stator 120, which provides a magnetic flux for the one or more permanent magnets 116 to interact with, thereby to drive motion of the acoustic diaphragm.

The stator 120 includes one or more cores 122 (two shown) which define an air gap 124. The cores 122 are formed of high magnetic permeability material around which coils 126 are wound. The lever 110 is positioned such that the armature 114 is in the air gap 124 and electrical current is passed through the coils 126 so that that the combination of the armature 114, the cores 122, and the coils 126 form a moving magnet motor. In this arrangement, the force results from the interaction of the magnetic field in the gap 124 due to the current flowing in the coils 126 and the magnetic field of the permanent magnet 116, so the force is applied to the lever 110 in a non-contact manner.

The lever 110 is pivotally connected to a mechanical ground reference, such as the enclosure 104 (e.g., via the frame 108) of the loudspeaker 100, at a pivot 130 such that the lever 110 moves in an arcuate path about a pivot axis 131. The lever 110 is connected to the acoustic diaphragm 102 via a connector 140.

Notably, the connector 140 is configured so as to allow the lever 110 to move relative to the acoustic diaphragm 102, thereby to allow the acoustic diaphragm 102 to move in a pistonic motion (arrow 141, FIG. 1B), rather than following the arcuate path of the lever 110.

Figure 2:
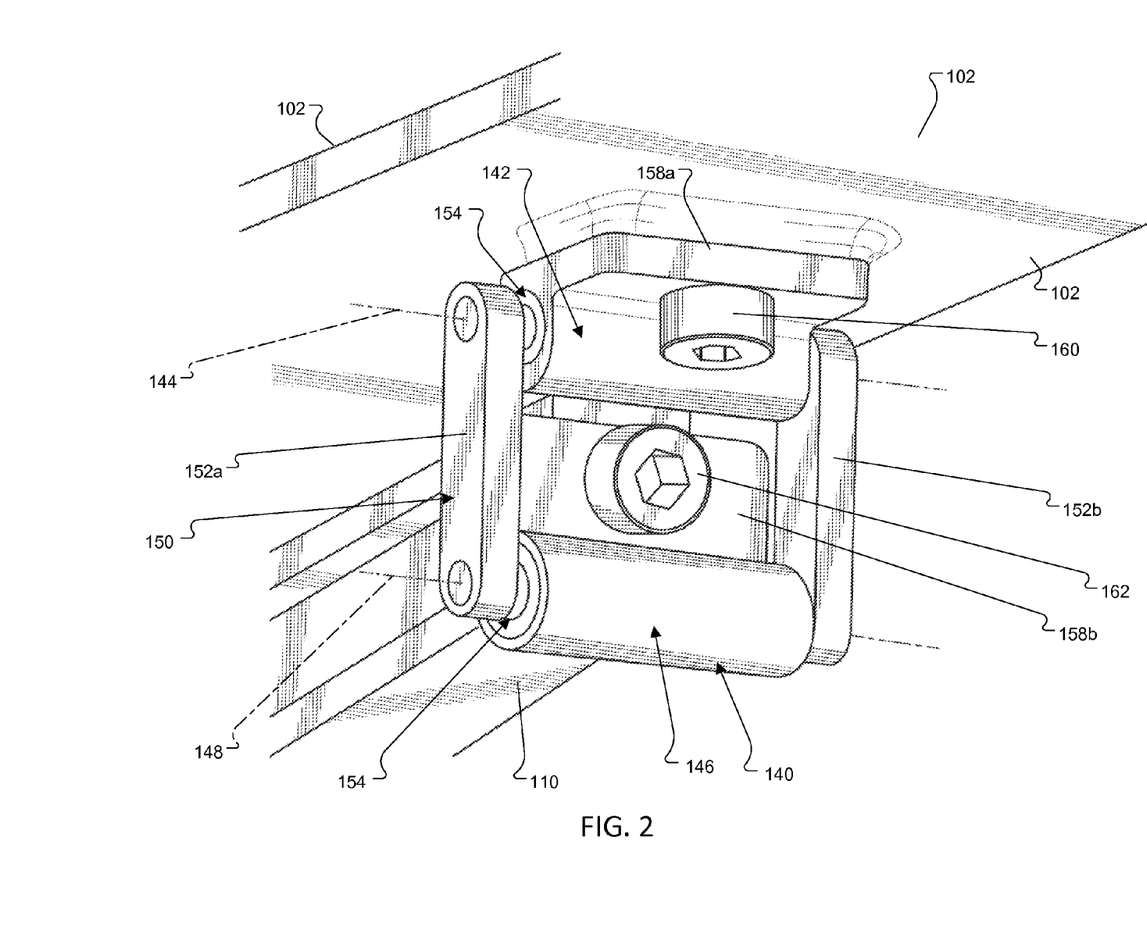
FIG. 2 is a detailed perspective view showing an exemplary connector connecting a lever to a bottom of an acoustic diaphragm in the loudspeakers of FIG. 1A.

Referring to FIG. 2, the connector 140 includes a first rotary joint 142 that defines a first rotary axis 144 which is fixedly attached to the acoustic diaphragm 102 so that the first rotary axis 144 does not move relative to the acoustic diaphragm 102. The connector 140 also includes a second rotary joint 146 that defines a second rotary axis 148 which is fixedly attached to the lever 110 so that that second rotary axis 148 does not move relative to the lever 110. The first and second rotary axes 144, 148 are arranged parallel with each other and parallel with the pivot axis 131 (FIGS. 1A and 1B) of the lever 110.

The connector 140 also includes a linkage 150 extending between and connecting the first and second rotary joints 142, 146 such that the linkage 150 pivots about the first and second rotary axes 144, 148 thereby facilitating the pistonic motion of the acoustic diaphragm 102. In the illustrated example, the linkage 150 includes a pair of links (first and second links 152a, 152b) which connect the first and second rotary joints 142, 146. The first link 152a connects a first end portion of the first rotary joint 142 to a first end portion of the second rotary joint 146. The second link 152b connects a second end portion of the first rotary joint 142 to a second end portion of the second rotary joint 146.

In the example illustrated in FIG. 2, the links 152a, 152b and the rotary joints 142, 146 are formed as separate pieces which are connected together. The links 152a, 152b can be formed of a rigid material, such as a metal or plastic. The rotary joints 142, 146 can comprise bushings 154, e.g., torsion bushings.

The connector 140 is also provided with a pair of tabs (i.e., first and second tabs 158a, 158b) disposed about a central portion of the bushings. The first tab 158a includes a first mounting hole for receiving a first fastener 160 for securing a central portion of the first rotary joint 142 to the acoustic diaphragm 102, and the second tab 158b includes a second mounting hole for receiving a second fastener 162 for securing a central portion the second rotary joint 146 to a distal end of the lever 110.

Other Implementations

Figure 3:
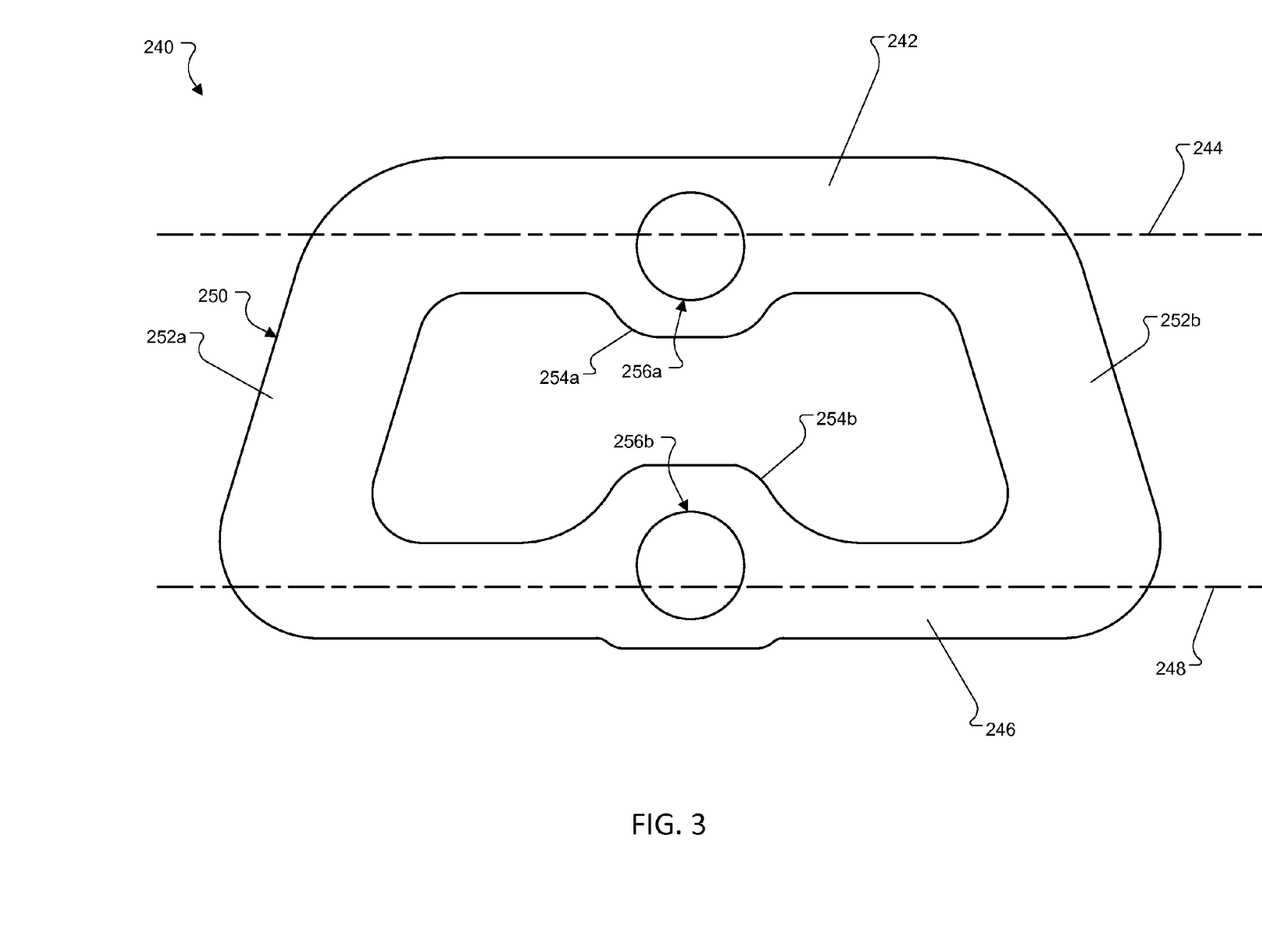
FIG. 3 is a plan view of an alternative connector that can be utilized for connecting the lever to the diaphragm in the loudspeaker of FIG. 1A.
Figure 4:
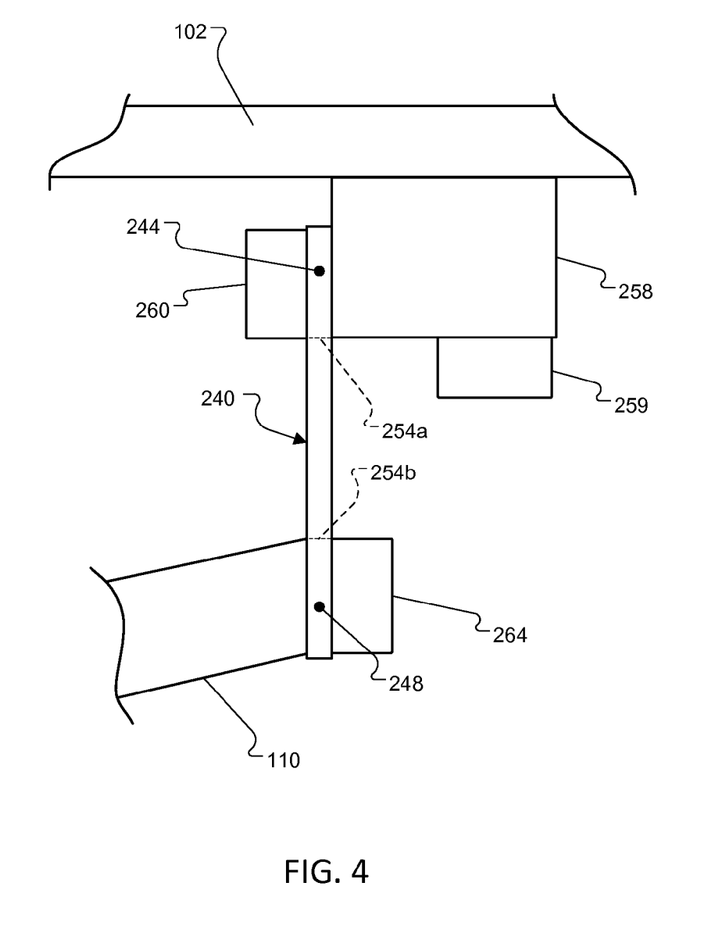
FIG. 4 is a detailed side view showing the connector of FIG. 3 connecting a distal end of the lever to the bottom of the acoustic diaphragm.

FIGS. 3 and 4 illustrate an alternative configuration for a connector 240 which can be utilized for securing the lever 110 (see, e.g., FIGS. 1A, 1B, and 4) to the acoustic diaphragm 102 (see, e.g., FIGS. 1A, 1B, and 4) to allow relative rotational and translational movement therebetween. In the example illustrated in FIGS. 3 and 4, the connector 240 is in the form of a clip which can be stamped out of a sheet of metal. Referring to FIG. 3, the connector 240 comprises a first rotary joint 242 that defines a first rotary axis 244 which can be fixedly attached to the acoustic diaphragm 102 (FIG. 4) so that the first rotary axis 244 does not move relative to the acoustic diaphragm 102. The connector 240 also includes a second rotary joint 246 that defines a second rotary axis 248 which can be fixedly attached to a distal end of the lever 110 (FIG. 4) so that that second rotary axis 248 does not move relative to the lever 110. The first and second rotary axes 244, 248 are arranged parallel with each other and parallel with the pivot axis 131 (FIG. 1A) of the lever 110 when the connector is mounted to the lever 110.

The connector 240 also includes a linkage 250 extending between and connecting the first and second rotary joints 242, 246 such that the linkage 250 pivots about the first and second rotary axes 244, 248 thereby facilitating the pistonic motion of the acoustic diaphragm 102. In the illustrated example, the linkage 250 includes a pair of links (first and second links 252a, 252b) which connect the first and second rotary joints 242, 246. The first link 252a connects a first end portion of the first rotary joint 242 to a first end portion of the second rotary joint 246. The second link 252b connects a second end portion of the first rotary joint 242 to a second end portion of the second rotary joint 246.

As mentioned above, the connector 240 is in the form of a clip which can be stamped, in a stamping process, out of a sheet of metal, such as spring steel, this can allow the first rotary joint 242, the second rotary joint 246, and the links 252a, 252b to be integrally formed. In the illustrated configuration, each of the first and second rotary joints 242, 246 take the form of a torsion bar which can twist about the respective rotary axes 244, 248.

The bending of the connector 240 (i.e., the regions where it bends and twists) can be controlled by varying the cross-section of the clip at different points. In general, it is desirable to make the links 252a, 252b stiffer than the torsion bars. The idea is to achieve relatively high stiffness in the direction of the axis of motion of the acoustic diaphragm 102 to withstand the column loads and not buckle; and relatively low lateral stiffness to accommodate relative movements between the lever 110 and the acoustic diaphragm 102. Generally, it is beneficial to control the material thickness so as to spread the bending around to distribute the strain so it is below the fatigue limit of the material. What is nice about the clip is its ability to have the links 252a, 252b swing (i.e., rotate about the first and second rotary axes 244, 248) and not have to bend to take up the lateral motion.

Such configurations can substantially reduce or eliminate asymmetric bending of the connector 240, and, consequently, can allow the pivot axis 131 (FIG. 1A) of the lever 110 to be positioned relatively closely to the acoustic diaphragm 102 (i.e., when the acoustic diaphragm 102 is in a rest (neutral displacement) position. As a result, the connector 240 can be beneficial to achieve a relatively thin (low profile) loudspeaker 100.

In some implementations, it is better to have the torsion bar of the second rotary joint 246 longer and thinner than the torsion bar of the first rotary joint 242. This is because the torsion bar at the lever 110 has to rotate more than the torsion bar at the acoustic diaphragm 102, and making it thinner helps to accommodate for that. Extending the length of the relatively thin torsion bar helps to distribute the strain allowing the torsion bar to take the twist without failing.

In the implementation illustrated in FIG. 3, the connector 140 is also provided with a pair of tabs (i.e., first and second tabs 254a, 254b) disposed about the midpoint of the torsion bars. The first tab 254a accommodates a first mounting hole 256a for securing a central portion of the first rotary joint 242 to the acoustic diaphragm 102, and the second tab 254b accommodates a second mounting hole 256b for securing a central portion the second rotary joint 246 to the lever 110.

Referring to FIG. 4, the first tab 254a is secured to a connection member 258 that can be connected to the acoustic diaphragm 102. The connection member 258 may be secured to the acoustic diaphragm 102 with a fastener 259 or may be formed as an integral part of the acoustic diaphragm 102. A fastener 260 secures the first tab 254a to the connection member 258. Preferably, the connection member 258 extends outwardly from the surface of the acoustic diaphragm 102 such that the connector 240 is spaced away from the surface of the acoustic diaphragm 102 to help inhibit buzz which might otherwise occur if the connector 240 rested against the surface of the acoustic diaphragm 102.

The second tab 254b is secured to a distal end of the lever 110 with a fastener 264. The distal end of the lever 110 can include mitered or chamfered edges so that the mounting surface (i.e., the surface of the lever against which the connector 240 rests) tapers away so as to minimize or eliminate any unclamped contact between the second tab 254b and the lever 110 which could be a source of buzz. Alternatively or additionally, the fastener 264 may secure a clamping plate (not shown) against an opposing surface of the second tab 254b such that the second tab 254b is clamped between the clamping plate and the distal end of the lever 110, thereby to minimize or eliminate any unclamped contact between the connector 240 and the lever 110. The idea is to have a force holding the second tab 254b against the distal end of the lever 110 over its entire surface so there is no relative motion that would be a source of buzz.

While an implementation has been described in which the connector 240 is secured to the acoustic diaphragm 102 and the lever 110 using fasteners (e.g., screws), in some implementations the connector 240 may be formed as an integral part with the acoustic diaphragm 102 and/or the lever 110. For example, the connector 240 and the lever 110 may both be made of a plastic material and formed integrally in an injection molding process. Alternatively or additionally, the connector 240 and the acoustic diaphragm 102 may both be made of a plastic material and formed integrally in an injection molding process.

Alternatively, the connector 240 may be secured to the lever 110 and/or the acoustic diaphragm 102 in an insert molding process. For example, the connector 240 can be formed from spring steel and the lever 110 and/or the acoustic diaphragm 102 can be formed from a plastic material that is molded around the connector 240.

Figure 5A:
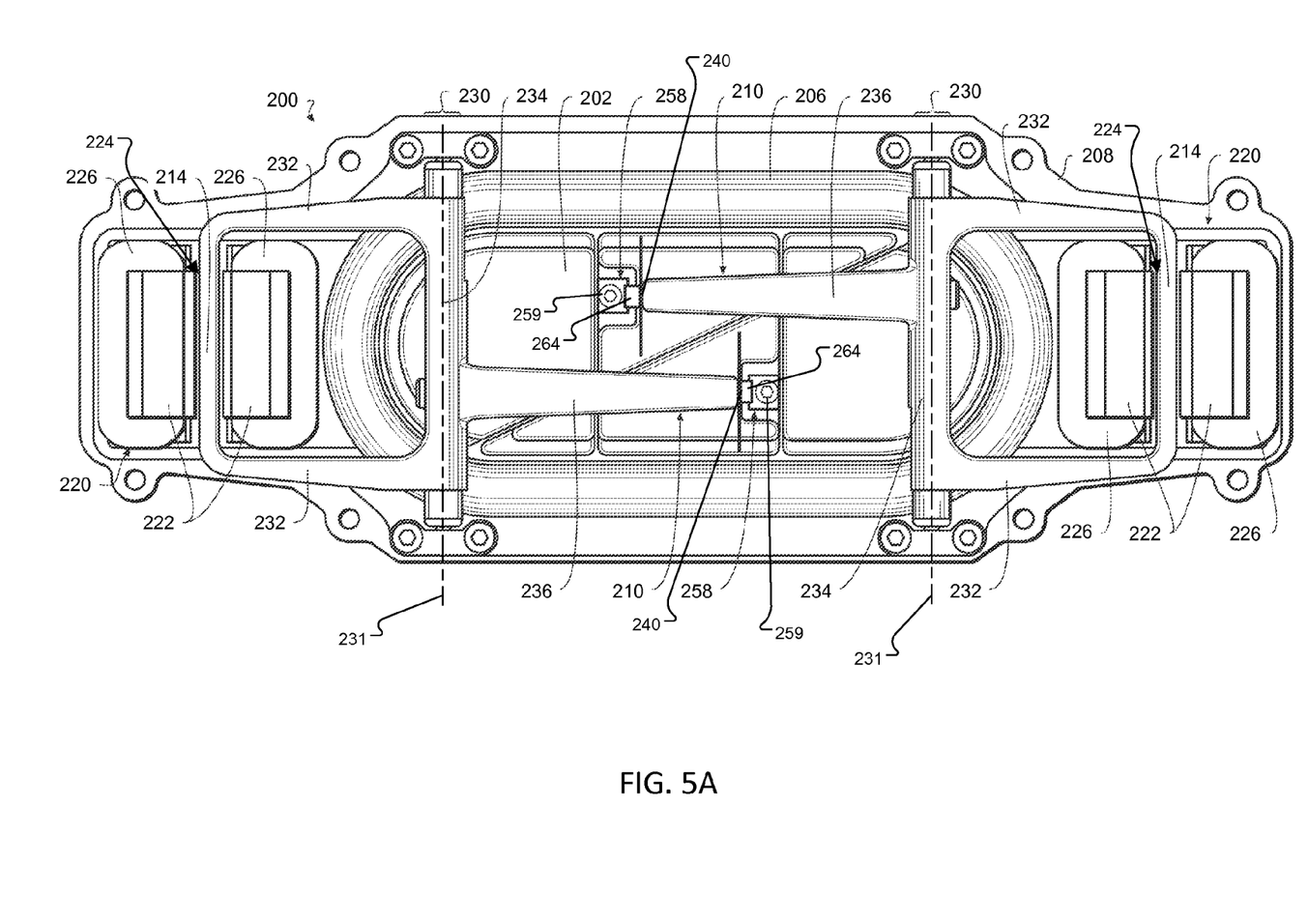
FIGS. 5A and 5B are bottom plan and perspective views, respectively, of a multi-lever loudspeaker which utilizes the connector of FIG. 3.
Figure 5B:
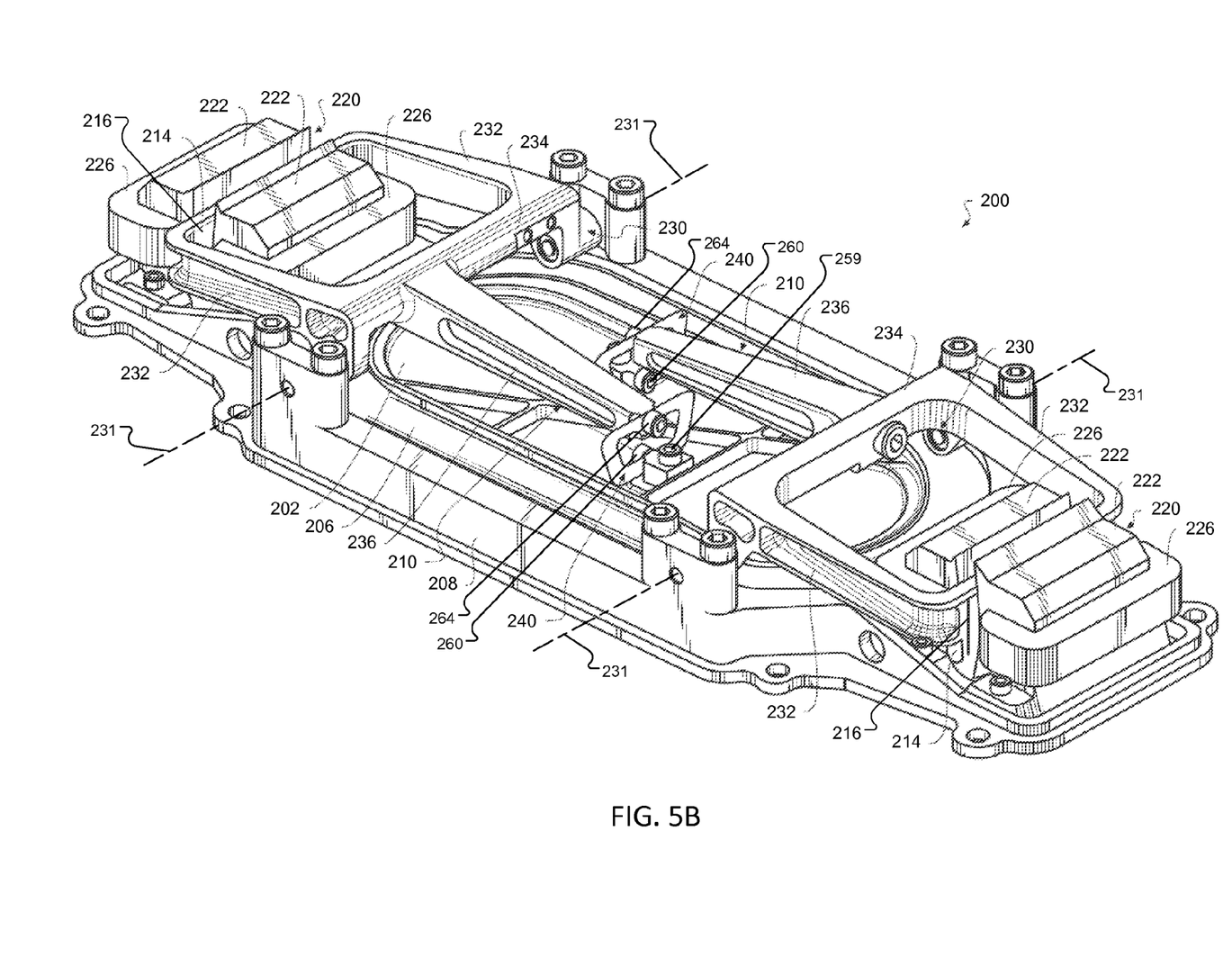

Although implementations have been described which include a single lever for driving motion of an acoustic diaphragm, multi-lever configurations are also possible. For example, FIGS. 5A and 5B illustrate an implementation of a loudspeaker that includes plural levers 210 (two shown). An acoustic diaphragm 202 is mounted to an enclosure (not shown) by a surround 206. The surround 206 is mounted to a frame 208 and the frame 208 is connected to the enclosure (not shown).

In the illustrated example, the levers 210 are arranged for rotation in opposite directions relative to each other. The levers 210 are pivotally connected to a mechanical ground reference, such as the enclosure or the frame 208 of the loudspeaker 200 at respective pivots 230 such that each of the levers 210 moves in an arcuate path about the respective pivot axes 231. The pivot axes 231 are arranged inboard of a pair of armatures 214, each of the armatures 214 being associated with a corresponding one of the levers 210. The levers 210 couple the armatures 214 to the acoustic diaphragm 202 for transmitting motions of the armatures 214 to the acoustic diaphragm 202.

Each of the armatures 214 includes a permanent magnet 216 (FIG. 5B), and each armature 214 is driven by an associated stator 220. The stators 220 provide magnetic flux for the permanent magnets 216 to interact with, thereby to drive motion of the acoustic diaphragm 202. Each of the stators 220 includes a pair of cores 222, which together define an air gap 224 (FIG. 5A) within which an associated one of the armatures 214 is disposed. The cores 222 can be secured to the frame 208 (e.g., with an adhesive).

Each core 222 includes a coil 226 of electrically conductive material wound about it. Current in coils 226 produce magnetic flux across the air gaps 224. The magnetic flux interacts with the permanent magnets 216 of the armatures 214 to drive the motion of the acoustic diaphragm 202.

Each lever 210 includes one or more support arms 232 (two shown) that support the armature 214. A cross-member 234 connects the support arms 232 to a lever arm 236. Notably, each lever arm 236 is connected to the acoustic diaphragm 202 via a respective connector 240. The connector 240 can have the construction discussed above with reference to FIG. 3 so as to allow the levers 210 to move relative to the acoustic diaphragm 202, thereby to allow the acoustic diaphragm 202 to move in a pistonic motion.

The first tab 254a (FIG. 3) of each of the connectors 240 is secured to the acoustic diaphragm 202 via a respective connection member 258. More specifically, each connection member 258 is secured to the back surface of the acoustic diaphragm 202 via a first fastener 259, and the first tab 254a of each of the connectors 240 is secured to a respective one of the connection members 258 via a second fastener 260 (FIG. 5B). The connection members 258 keep the connectors 240 spaced away from the surface of the acoustic diaphragm 202 to help inhibit buzz which might otherwise occur if the connectors 140 rested against the surface of the acoustic diaphragm 202.

The second tab 254b (FIG. 3) of each of the connectors 240 is secured to a distal end of a respective one of the lever arms 236 via third fasteners 264. The distal ends of the lever arms 236 can include mitered or chamfered edges so that the mounting surface (i.e., the surface of the lever against which the connector 240 rests) tapers away so as to minimize or eliminate any unclamped contact between the second tab 254b and the lever 210 which could be a source of buzz.

Figure 6:
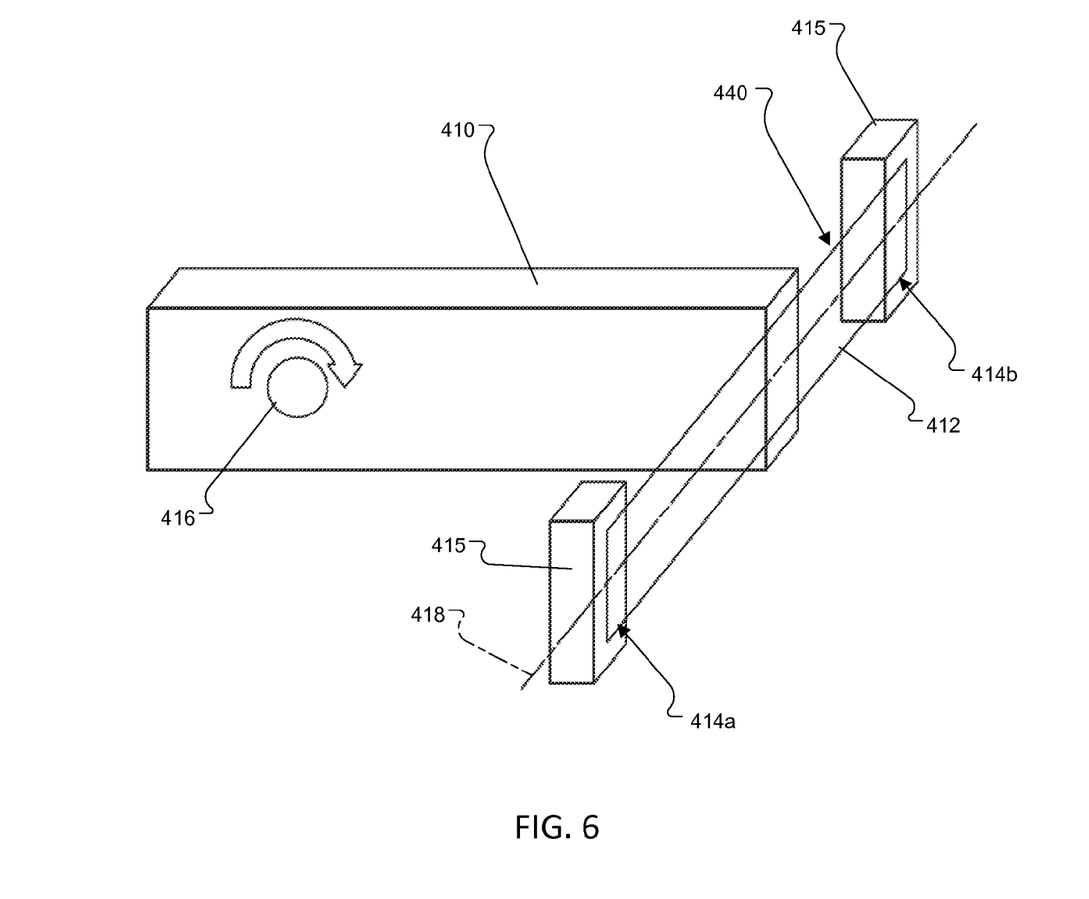
FIG. 6 is a detailed perspective view showing a lever with another alternative connector for connecting the lever to an acoustic diaphragm.

FIG. 6 illustrates yet another configuration of a connector 440 in the form of a single torsion bar 412. A central portion of the torsion bar 412 is secured to a distal end of a lever 410. Distal end portions 414a, 414b of the torsion bar 412 are secured to an acoustic diaphragm (not shown) via connection members 415 such that the distal end portions 414a, 414b do not move relative to the acoustic diaphragm. The connection members 415 may be formed as integral parts of the acoustic diaphragm or may be secured to the acoustic diaphragm with fasteners, adhesive, welds, etc. The torsion bar 412 can be formed of spring steel and can be secured to the distal end of the lever 410 with a fastener (such as a screw), adhesive, weld, etc. (not shown).

As the lever 410 rotates (e.g., driven by an oscillator force source) about a pivot axis 416, the distal end portions 414a, 414b of the torsion bar 412 twist (rotate) about a rotary axis 418 thereby allowing the lever 410 to move (rotate and translate laterally) relative to the acoustic diaphragm such that the acoustic diaphragm is driven in a pistonic motion via the rotational movement of the lever 410.

The connector 440 of FIG. 6 could, for example, be utilized with the loudspeaker configuration of FIG. 1A or FIG. 4A for securing the lever 110 or levers 210 to the acoustic diaphragm 102, 202.

A number of implementations have been described. Nevertheless, it will be understood that additional modifications may be made without departing from the scope of the inventive concepts described herein, and, accordingly, other embodiments are within the scope of the following claims.

What is claimed is:

1. A loudspeaker comprising:
   A.) an acoustic diaphragm;
   B.) a lever;
   C.) an oscillatory force source for driving the lever in oscillatory, rotary motion about a pivot axis; and
   D.) a connector coupling the lever to the acoustic diaphragm, the connector comprising:
      i.) a first rotary joint defining a first rotary axis fixedly attached to the acoustic diaphragm,
      ii.) a second rotary joint defining a second rotary axis fixedly attached to the lever, and
      iii.) a linkage coupling the first and second rotary joints,
   wherein the connector allows for rotational and translational movement of the lever and the diaphragm relative to each other, wherein the second rotary joint comprises a tab including a mounting hole for receiving a fastener for securing a central portion of the second rotary joint to the lever.

2. The loudspeaker of claim 1, wherein the first and second rotary axes are arranged parallel with each other and parallel with the pivot axis.

3. The loudspeaker of claim 1, wherein the linkage includes a pair of links which couple the first and second rotary joints, the pair of links comprising:
   a first link coupling a first end portion of the first rotary joint to a first end portion of the second rotary joint; and
   a second link coupling a second end portion of the first rotary joint with a second end portion of the second rotary joint.

4. The loudspeaker 1, wherein the connector is in the form of a unitary clip.

5. The loudspeaker of claim 1, wherein the first and second rotary joints are formed integrally with the linkage.

6. The loudspeaker of claim 1, wherein the connector is a stamped, unitary part.

7. The loudspeaker of claim 1, wherein the connector is formed of spring steel.

8. The loudspeaker of claim 1, wherein the first rotary joint comprises a torsion bar which twists about the first rotary axis as rotary motion of the lever drives the acoustic diaphragm in a pistonic motion.

9. The loudspeaker of claim 1, wherein the second rotary joint comprises a torsion bar which twists about the second rotary axis as rotary motion of the lever drives the acoustic diaphragm in a pistonic motion.

10. The loudspeaker of claim 1, wherein the first rotary joint comprises a first torsion bar which twists about the first rotary axis as rotary motion of the lever drives the acoustic diaphragm in a pistonic motion, and the second rotary joint comprises a second torsion bar which twists about the second rotary axis as rotary motion of the lever drives the acoustic diaphragm in a pistonic motion, and
   wherein the second torsion bar is configured to twist more than the first torsion bar as rotary motion of the lever drives the acoustic diaphragm in a pistonic motion.

11. The loudspeaker of claim 1, wherein the first rotary joint comprises a tab including a mounting hole for receiving a fastener for securing a central portion of the first rotary joint to the acoustic diaphragm.

12. The loudspeaker of claim 1, wherein the connector is formed integrally with the lever.

13. The loudspeaker of claim 1, wherein the connector is formed integrally with the diaphragm.

14. The loudspeaker of claim 1, wherein at least part of the lever is formed around the connector in an insert molding process.

15. The loudspeaker of claim 1, wherein at least part of the diaphragm is formed around the connector in an insert molding process.

16. A loudspeaker comprising:
   an acoustic diaphragm;
   a lever;
   an oscillatory force source for driving the lever in oscillatory, rotary motion about a pivot axis; and
   a connector coupling the lever to the acoustic diaphragm, the connector comprising a first torsion bar configured to twist about a first rotary axis,
   wherein a central portion of the first torsion bar is secured to the lever such that the first rotary axis does not move relative to the lever, and
   wherein the connector allows for rotational and translational movement of the lever and the diaphragm relative to each other, wherein at least part of the diaphragm is formed around the connector in an insert molding process.

17. The loudspeaker of claim 16, wherein distal end portions of the first torsion bar are fixedly secured to the acoustic diaphragm.

18. The loudspeaker of claim 17, wherein the distal end portions of the first torsion bar twist about the first rotary axis, thereby allowing the lever to rotate and translate laterally relative to the diaphragm, as the acoustic diaphragm is driven in pistonic motion via rotational movement of the lever.

19. The loudspeaker of claim 16, wherein the connector further comprises:
   a second torsion bar configured to twist about a second rotary axis; and a linkage coupling the first and second torsion bars,
wherein a central portion of the second torsion bar is fixedly secured to the acoustic diaphragm,
wherein the linkage is configured to rotate about the first and second rotary axes, without bending, as the acoustic diaphragm is driven in pistonic motion via rotational movement of the lever.

20. A loudspeaker comprising:
A.) an acoustic diaphragm;
B.) a lever;
C.) an oscillatory force source for driving the lever in oscillatory, rotary motion about a pivot axis; and
D.) a connector coupling the lever to the acoustic diaphragm, the connector comprising:
   i.) a first rotary joint defining a first rotary axis fixedly attached to the acoustic diaphragm,
   ii.) a second rotary joint defining a second rotary axis fixedly attached to the lever, and
   iii.) a linkage coupling the first and second rotary joints,
wherein the connector allows for rotational and translational movement of the lever and the diaphragm relative to each other, wherein the connector is formed integrally with the diaphragm.

* * * * *